W. N. HORTON.
Wooden Pipe-Joint.
No. 206,177.  Patented July 23, 1878.
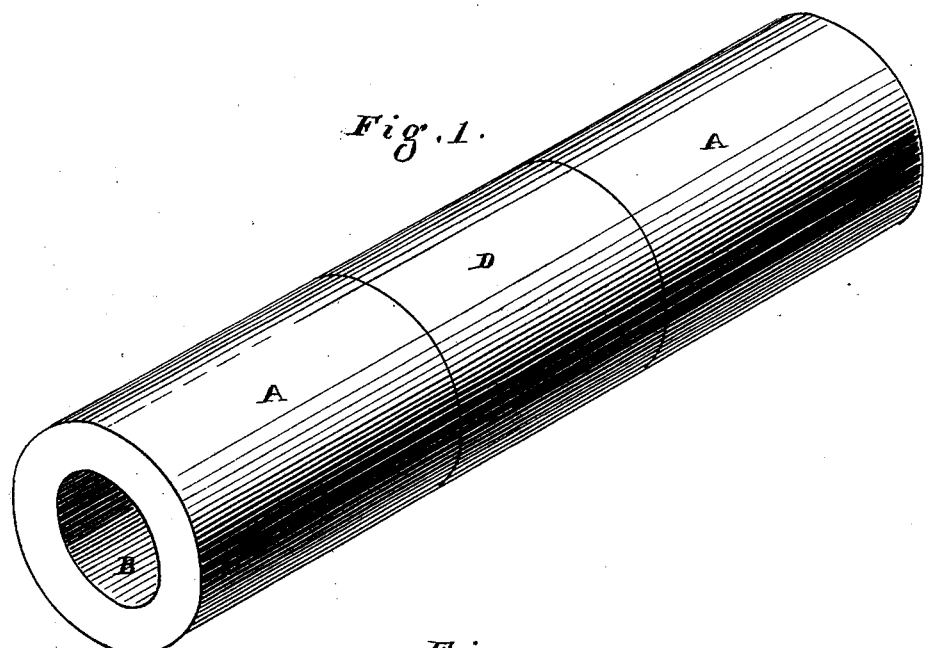
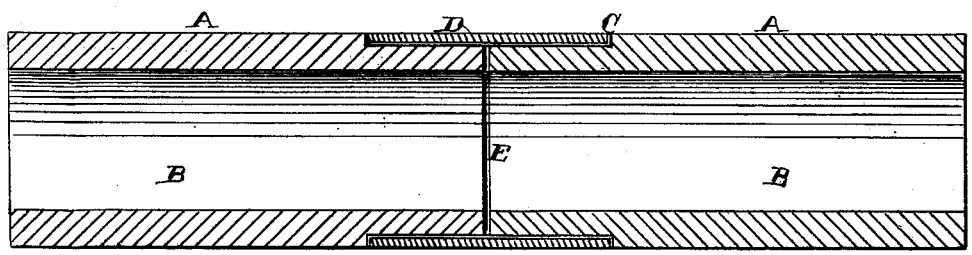
Witnesses
Geo. H. Strong.
Frank A. Brooks
Inventor
William N. Horton
by Dewey & Co.
Attys

UNITED STATES PATENT OFFICE.

WILLIAM N. HORTON, OF SAN FRANCISCO, CALIFORNIA.

IMPROVEMENT IN WOODEN-PIPE JOINTS.

Specification forming part of Letters Patent No. 206,177, dated July 23, 1878; application filed May 27, 1878.

*To all whom it may concern:*

Be it known that I, WILLIAM NEWMAN HORTON, of the city and county of San Francisco, and State of California, have invented Improvements in Wooden-Pipe Joints; and I do hereby declare the following to be a full, clear, and exact description thereof, reference being had to the accompanying drawings.

My invention relates to certain valuable improvements in the construction and union of the sections of wooden pipe, such as are employed to convey water. This class of pipe is usually formed by boring out logs, so as to provide an opening of a certain size, and one end of each log is counterbored to receive the opposite end of the next section, which is made small enough to enter this counterbore, and thus the lengths are joined and the pipe is formed.

Two serious defects accompany this method of joining the pipes: the first is, that the sections must be made much larger, in order to give the required strength to the joints, than would be needed to resist the pressure of water from the interior of the pipe, and the second is, that the outside or shell of the counterbore is frequently destroyed by dry-rot, or from other similar causes, on account of its not being kept wet, and the joint of the pipe is thus ruined.

It is well known that when wood is kept saturated with water it is nearly indestructible, and my invention contemplates so forming the joint that I allow the water flowing in the pipe to have free access to the ends of the sections, so that it may permeate the entire section through its pores and drive the sap out; also, in forming the joint by the aid of an exterior surrounding band, which does away with the counterbore, and thus enables me to construct my pipe of sufficient strength to resist the pressure that may be brought to bear upon it with only about one-half the amount of wood needed in the ordinary method of construction.

Referring to the accompanying drawings for a more complete explanation of my invention, Figure 1 is an external view of my pipe. Fig. 2 is a section of the same.

A A are two sections or lengths of pipe, which are bored out to form a passage, B, for the flow of water. In order to join these lengths of pipe solidly together, and at the same time leave a space between their ends which will admit water, which the pressure will force into the pores longitudinally, I turn down or reduce the ends of each section, as shown at C, and fit upon these meeting ends an iron or other suitable band, D. The shoulders upon the lengths formed by the reduced end portions of the pipes allow them to be driven into the band so as to nearly meet; but a space, E, is left between the meeting ends, into which water may pass from the interior of the pipe. This water will pass longitudinally through the pores of the wood, thus expelling the sap, and producing in the whole of the pipe that condition known as "water soaked," which will effectually preserve it from decay. The meeting band is made of any material sufficiently strong to hold the pipes together, and is coated with tar, asphaltum, or other preservative substance.

By this construction it will be seen that I am enabled to preserve my pipe, make a neat strong joint, and to greatly reduce the amount of wood needed in it, by doing away with the counterbored socket and corresponding reduced end.

Having thus described my invention, what I claim as new, and desire to secure by Letters Patent, is—

The sections A A, in combination with the uniting-band D, said sections being fitted to enter the band from opposite ends, and leave a space, E, between their meeting ends for the admission of water, substantially as shown and for the purpose herein described.

In witness whereof I hereunto set my hand.

WILLIAM NEWMAN HORTON.

Witnesses:
GEO. H. STRONG,
FRANK A. BROOKS.